UNITED STATES PATENT OFFICE.

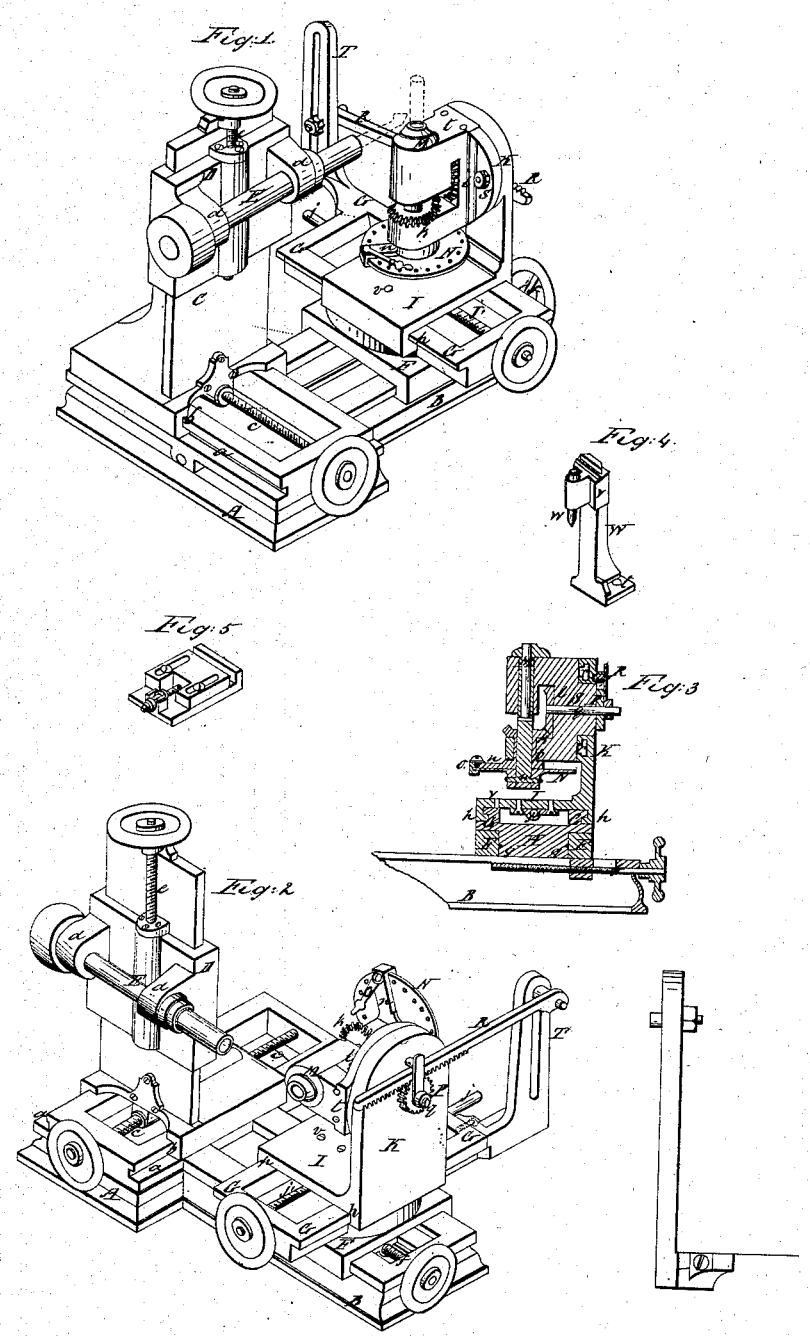

MOSES G. WILDER, OF WEST MERIDEN, CONNECTICUT.

IMPROVEMENT IN MACHINES FOR MILLING AND CUTTING METALS.

Specification forming part of Letters Patent No. 36,744, dated October 21, 1862.

*To all whom it may concern:*

Be it known that I, MOSES G. WILDER, of West Meriden, in the county of New Haven and State of Connecticut, have invented a new and useful Improvement in Machinery for Milling and Cutting Metals, &c.; and I do hereby declare that the following is a full, clear, and exact description of the construction, character, and operation of the same, reference being had to the accompanying drawings, which make part of this specification, in which—

Figure 1 is a perspective view of the machine as seen from the left hand and front, showing the cutter-shaft, main spindle, &c. Fig. 2 is a perspective view of the same as viewed from the right hand and front, showing the cutter-shaft and main spindle in a different position, also the rack and pin used in cutting spirals, and the index. Fig. 3 is a section of the right-hand or movable portion, cut vertically through the center of the several parts when the main spindle is in a vertical position, showing the relative position of the several adjustable parts. Fig. 4 is a perspective view of a part or fixture to be attached (when an extra male or female center is needed to sustain the article being wrought) to the front bearing of the main spindle by screws entering the holes $t$ in Figs. 1 and 2. Fig. 5 is a perspective view of a vise, which may be attached, when convenience requires, by dropping the dowel on the under surface into the hole $v$, Figs. 1, 2, and 3, in the upper surface of the sliding bed I.

My improvement consists in so constructing and arranging the several parts of the machine that I am able to cut any form or grade (either regular or variable) of spiral or bevel on any article, or any portion of any article, as I may desire, by the use of the rack and pinion, or racks and pinions, in connection with the bevel gear-wheels and index and the swiveling or revolving and rotating motions of the main spindle, and the use of the adjusting-screws at right angles, or otherwise, to be worked by hand, bands, or gearing in the usual way, or otherwise.

I make the main bed frame or platform of cast-iron or any other suitable material, of the cross or T shape, substantially as represented at A and B, Figs. 1 and 2, or in any other convenient form.

I make the upright or standard for supporting the carrier of the cutter shaft or holder of cast-iron or any other suitable material, of the form shown at C, Figs. 1 and 2, and attach it to the ways of the part A of the platform by means of grooves $a$ and ribs or tongues $b$, as shown in Figs. 1 and 2, or in any other suitable or convenient way, so as to render it readily and accurately adjustable horizontally—that is, from front to rear—by means of an adjusting screw, as shown at $c$, Figs. 1 and 2, in the usual way.

I make the sliding carrier of the cutter-holder of cast-iron or any other suitable material, and fit it to slide vertically on the standard C, substantially as represented at D, Figs. 1 and 2, with suitable projections or lugs to serve as bearings for the cutter-shaft, as shown at $d$ and $d$, Figs. 1 and 2; and I adjust this sliding carrier vertically by means of an adjusting-screw, $e$, Figs. 1 and 2.

I make the cutter shaft or holder E of steel or any other suitable material, in the usual way or otherwise, and fit it for rotating in its bearings $d$ and $d$, or to be used in any other desired way, as occasion may require.

To the part B of the platform I fit a sliding bed, as shown at F, Figs. 1 and 2, and indicated at F and F, Fig. 3, to be adjusted horizontally (right and left) on ways by an adjusting-screw, as shown at $f$, Figs. 2 and 3, in the usual way. On this sliding bed F, I fit another set of ways, as shown at G, Figs. 1 and 2, and indicated at G and G, Fig. 3, which may be swiveled or revolved (a complete revolution) horizontally on the center H, Fig. 3, which center is held in its place by conical points of screws working in a V-shaped groove (shown at $g$ $g$, Fig. 3) extending around the periphery. On the revoluble ways G, I fit another slide or sliding bed, I, Figs. 1, 2, and 3, connected with the ways G by grooves and tongues or ribs, as shown at $h$, Figs. 1, 2, and 3, and may be adjusted horizontally by the adjusting-screw $j$, Figs. 1, 2, and 3, or by any other convenient means. With this bed I is connected (or cast in one piece with it) an upright or standard, as shown at K, Figs. 1, 2, and 3, which supports the main spindle M, bevel gear-wheels $k$ and $l$, index-plate N and its appurtenances, pinion P, and one end of the rack R.

I make the main spindle M of steel or any other suitable material, of the usual form, as shown in Figs. 1 and 2, and in longitudinal section in Fig. 3, suited to receive the end of a material to be wrought, or a suitable chuck to hold the material. On the back end of this main spindle I secure the graduated index-plate N by means of a pin, as shown in section at $m$, Fig. 3, or by any other suitable means. The radius or arm $n$ of this index, which carries or sustains the spring hand or point $o$, (by which the graduated plate is secured at the desired adjustment,) is immovably attached to one end of the sleeve $p$ of the bevel gear-wheel $k$, and is revolved with it in cutting spirals of all kinds.

The bevel gear-wheel $k$ is revolved by the bevel gear-wheel $l$, the arbor $q$ of which passes through the center or journal S, Fig. 3, (on which the main spindle, &c., revolve vertically,) and holds the pinion P, on which the rack R works, so that when the sliding bed I (by means of the screw $j$) is moved toward or from the slotted upright T the rack R will revolve the pinion P, which, by means of the bevel gear-wheels $l$ and $k$, will revolve the index-plate N, with its appurtenances, and also the main spindle M, so as to give a combined rotary and rectilinear motion to the spindle and the material being wrought by the cutter, and will thereby produce a spiral or helical cut—as a screw, for instance.

The bearings of the main spindle M are secured to the upright K by means of a center or journal, as shown in section at S, Fig. 3, and two screws, the heads of which move in a circular slot in the upright K, (shown in section at $r$ and $r$, Fig. 3,) and by nuts on the outer ends, one of which is shown at $s$, Fig. 1, and the other is opposite, so as to allow the main spindle and its appurtenances a complete vertical revolution, so that it may be used in the position shown in Figs. 1 and 3, or in Fig. 2, or in any intermediate position, as the nature of the work may require or render convenient. The main spindle and its appurtenances being thus susceptible of a complete revolution both horizontally and vertically, combined with its two rectilinear motions and its rotary motion on its own axis, (by means of the rack and pinion and bevel gear-wheels,) may be put in every desired relative position with the cutter, however that may be used.

To cut opposite spirals—as right-hand screws and left-hand screws—I have only to reverse the position of the rack R—for right-hand, put it below the pinion P, as in Fig. 1, and for left-hand put it above, as in Fig. 2; and to vary the pitch of the thread the stud of the rear end of the rack R may be raised or lowered in the slot in the upright T, so as to change the relative extent of the right motion to the revolution. This upright T is made separate from the machine itself, but may be attached to it, when required, by means of screws or otherwise; or the rack may be curved and have the teeth on the convex surface for one pitch and on the concave surface for another; or for variable pitches the curve of the rack may vary gradually, as desired, or may be a part curved in one direction, part straight, and another part curved in the opposite direction to the first; or one or more pinions or wheels may be put on studs on the upright T, and one or more pinions or wheels in connection with the pinion P, so as to vary the proportions at will by substituting one rack for another or others, and by using one or more pinions of the proper size, &c. All the rectilinear motion may be given by gear-wheels or bands, or by hand, as is found most convenient and accurate in each particular case.

I make the stock W of the part or fixture, Fig. 4, of cast-iron or any other suitable material, on which I fit a slide, $v$, which carries an extra or dead center, $w$, so that when an extra center is needed to support the material being wrought this stock W may be attached to the front bearing of the main spindle M by means of screws entering holes at $t$, Figs. 1, 2, and 4.

I am aware that the supporting apparatus of the main spindle has been so connected with the platform as to allow of its being swiveled or rotated both horizontally and vertically to some extent, and that racks and pinions have long been used to convert a rectilinear into a rotary motion. I therefore do not claim either of these, as such; but

What I claim as my invention, and desire to secure by Letters Patent, is—

1. The combination of the main spindle M with the revoluble ways G, when so constructed and arranged as to allow the spindle to revolve through a complete circle both horizontally and vertically, and the whole is constructed, arranged, and made to operate substantially as herein described.

2. The combination of the main spindle M with the cutter-holder E when so constructed and arranged that the article being wrought may be placed by it in every position and at every angle with the cutter, substantially as herein described.

3. The combination of the cutter-stock with the revoluble and rotating spindle and adjustable rack, as and for the purposes set forth.

4. Cutting spirals, either regular or irregular, by varying the direction of the pitch-line of the rack, substantially as described.

5. The combination of an adjustable dead-center with the main spindle in such a manner as that the center shall remain concentric with the spindle during the whole operation.

MOSES G. WILDER.

Witnesses:
S. THOMPSON,
R. FITZGERALD.